US011593725B2

(12) United States Patent
Palazzo et al.

(10) Patent No.: US 11,593,725 B2
(45) Date of Patent: Feb. 28, 2023

(54) GAZE-BASED WORKFLOW ADAPTATION

(71) Applicant: AT&T Intellectual Property I, L.P., Atlanta, GA (US)

(72) Inventors: Richard Palazzo, Stewartsville, NJ (US); Lee Begeja, Gillette, NJ (US); David Crawford Gibbon, Lincroft, NJ (US); Zhu Liu, Marlboro, NJ (US); Tan Xu, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 209 days.

(21) Appl. No.: 16/385,652

(22) Filed: Apr. 16, 2019

(65) Prior Publication Data
US 2020/0334613 A1     Oct. 22, 2020

(51) Int. Cl.
G06Q 10/06     (2012.01)
G09B 19/00     (2006.01)
G06F 3/01     (2006.01)
G06Q 10/0631     (2023.01)

(52) U.S. Cl.
CPC ..... *G06Q 10/063114* (2013.01); *G06F 3/013* (2013.01); *G09B 19/003* (2013.01)

(58) Field of Classification Search
None
See application file for complete search history.

(56) References Cited

U.S. PATENT DOCUMENTS

| 7,091,471 | B2 | 8/2006 | Wenstrand et al. |
| 9,772,612 | B2 | 9/2017 | McCarthy, III et al. |
| 9,851,790 | B2 | 12/2017 | Raux |
| 2011/0270123 | A1* | 11/2011 | Reiner ............... G06F 3/013 600/558 |
| 2015/0156803 | A1* | 6/2015 | Ballard ............... G06F 3/017 455/422.1 |
| 2017/0293363 | A1 | 10/2017 | McLaughlin |
| 2017/0344107 | A1 | 11/2017 | Aghara et al. |
| 2018/0225509 | A1 | 8/2018 | Schmidt et al. |
| 2018/0285065 | A1 | 10/2018 | Jeong |
| 2020/0104522 | A1* | 4/2020 | Collart ............... G06F 3/011 |

FOREIGN PATENT DOCUMENTS

JP     2017510913 A  *  4/2017  ............. G06Q 50/10

OTHER PUBLICATIONS

F Wallhoff, et al., Adaptive Human-Machine Interfaces in Cognitive Production Environments, Human-Machine Communication, Theresienstr. 90, 80333 Munich, 2007 (Year: 2007).*

* cited by examiner

Primary Examiner — Shelby A Turner
Assistant Examiner — Matthew H Divelbiss

(57) ABSTRACT

A method for gaze-based workflow adaptation includes identifying a workflow in which a user is engaged, where the workflow comprises a plurality of tasks that collectively achieves a desired goal, creating a trigger for a given task of the plurality of tasks, wherein the trigger specifies an action to be automatically taken in response to a gaze of the user meeting a defined criterion, monitoring a progress of the workflow, monitoring the gaze of the user, and sending a signal to a remote device in response to the gaze of the user meeting the defined criterion, wherein the signal instructs the remote device to take the action.

20 Claims, 3 Drawing Sheets

GAZE-BASED WORKFLOW ADAPTATION

The present disclosure relates generally to workflow automation, and relates more particularly to systems, non-transitory computer-readable media, and methods for adapting workflows based on user gaze.

BACKGROUND

A workflow comprises a defined, repeatable series of tasks that collectively achieves a desired goal (e.g., transforms materials, provides services, processes information, or the like). The series of tasks may comprise physical tasks, digital tasks, or a combination of physical and digital tasks. For instance, a workflow may involve carrying out a series of physical tasks while simultaneously interacting with a digital component to retrieve information, execute tests or operations, and/or validate intermediate functions while the physical tasks are being carried out.

SUMMARY

The present disclosure describes a device, computer-readable medium, and method for adapting workflows based on user gaze. A method for gaze-based workflow adaptation includes identifying a workflow in which a user is engaged, where the workflow comprises a plurality of tasks that collectively achieves a desired goal, creating a trigger for a given task of the plurality of tasks, wherein the trigger specifies an action to be automatically taken in response to a gaze of the user meeting a defined criterion, monitoring a progress of the workflow, monitoring the gaze of the user, and sending a signal to a remote device in response to the gaze of the user meeting the defined criterion, wherein the signal instructs the remote device to take the action.

In another example, a non-transitory computer-readable storage medium stores instructions which, when executed by a processor, cause the processor to perform operations. The operations include identifying a workflow in which a user is engaged, where the workflow comprises a plurality of tasks that collectively achieves a desired goal, creating a trigger for a given task of the plurality of tasks, wherein the trigger specifies an action to be automatically taken in response to a gaze of the user meeting a defined criterion, monitoring a progress of the workflow, monitoring the gaze of the user, and sending a signal to a remote device in response to the gaze of the user meeting the defined criterion, wherein the signal instructs the remote device to take the action.

In another example, a system includes a processor deployed in a telecommunication service provider network and a non-transitory computer-readable storage medium stores instructions which, when executed by the processor, cause the processor to perform operations. The operations include identifying a workflow in which a user is engaged, where the workflow comprises a plurality of tasks that collectively achieves a desired goal, creating a trigger for a given task of the plurality of tasks, wherein the trigger specifies an action to be automatically taken in response to a gaze of the user meeting a defined criterion, monitoring a progress of the workflow, monitoring the gaze of the user, and sending a signal to a remote device in response to the gaze of the user meeting the defined criterion, wherein the signal instructs the remote device to take the action.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
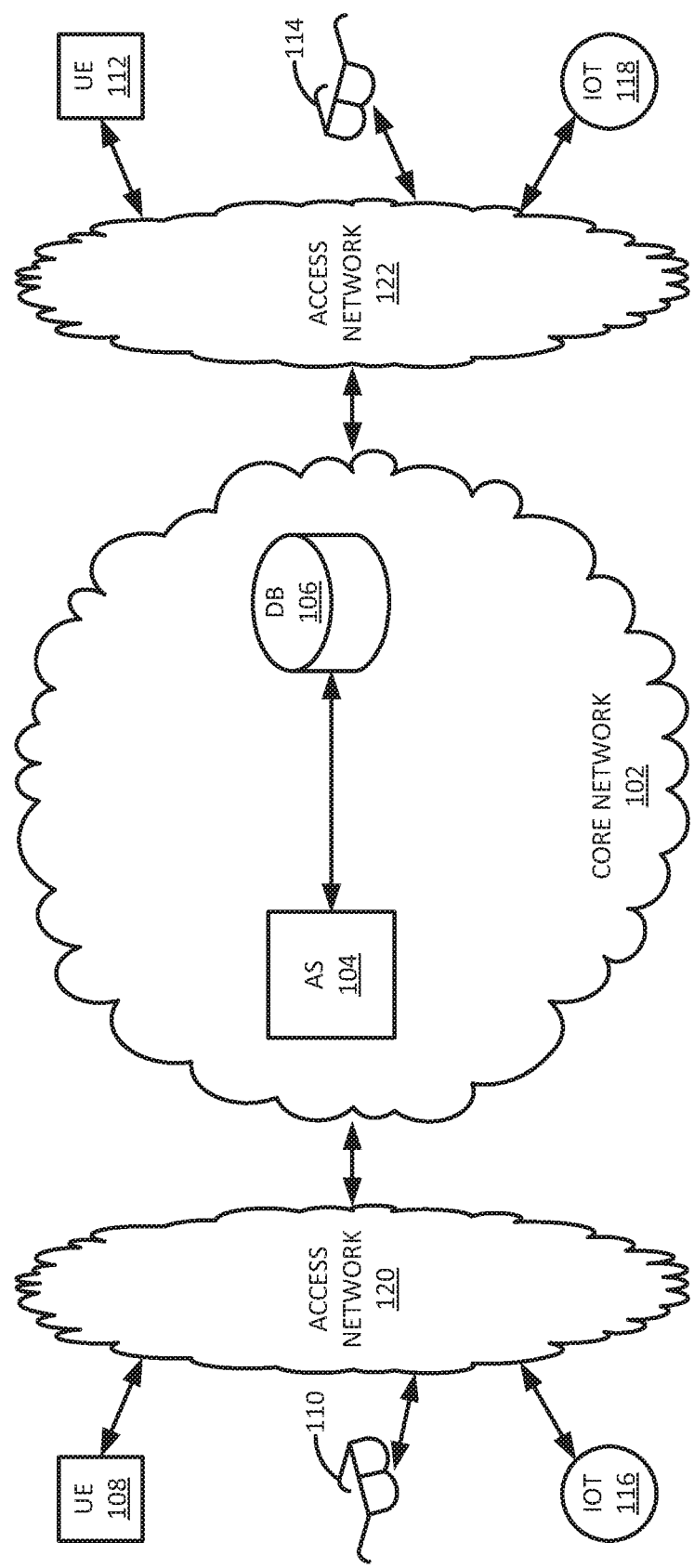
FIG. 1 illustrates an example system in which examples of the present disclosure for gaze-based workflow adaptation may operate.

In one example, the present disclosure provides systems, non-transitory computer-readable media, and methods for gaze-based workflow adaptation. As discussed above, a workflow may comprise a series of physical tasks, digital tasks, or a combination of physical and digital tasks. For instance, a workflow may involve carrying out a series of physical tasks while simultaneously interacting with a digital component to retrieve information, execute tests or operations, and/or validate intermediate functions while the physical tasks are being carried out.

In the extended reality (XR) domain, modification of workflows tends to be a cumbersome process, often requiring lengthy reviews and approvals. This lengthy review and approval process is unrealistic, however, given the dynamic nature of the XR domain. For instance, opportunities may be missed to improve workflow efficiency based on in-the-field observations and/or real-time user context.

Examples of the present disclosure allow workflows and/or discrete tasks of workflows to be triggered by real-time user context. The real-time user context may be derived from tracking of the user's gaze (e.g., using XR or other technology that allows for gaze tracking). For instance, complex actions may be triggered automatically in response to the user looking at a specific item. The actions triggered by the user's gaze may be local actions (e.g., directly impacting an item the user is looking at, like turning on a coffee brewing machine when the user looks at the coffee brewing machine) or remote actions (e.g., indirectly impacting an item the user is looking at, like mixing, searching or ordering a recipe for coffee when the user is looking at a coffee brewing machine).

Within the context of the present disclosure, "gaze tracking" refers to the process of measuring the point of gaze (i.e., where the user is looking). There are many techniques for measuring the point of gaze, and these techniques tend to fall into one of a plurality of categories. One category of techniques comprises eye-attached tracking, i.e., measurement of the movement of an object (e.g., a special contact lens) attached to the user's eye. Another category of techniques comprises electric potential measurement, i.e., the measurement of electric potentials using electrodes placed around the user's eyes. Another category of techniques comprises optical tracking, i.e., the use of non-contact optical methods for measuring eye motion.

Some optical tracking techniques utilize light (e.g., infrared light or other wavelengths which are typically invisible to the human eye, and therefore less likely to interfere with the user's experience) which is reflected from the user's eye and sensed by a video camera or other type of specially designed optical sensor. Information such as eye rotation can be derived from changes in sensed reflections. Video-based eye trackers may use the corneal reflection and the center of the pupil as features to track over time. More sensitive types of eye trackers may use reflections from the front of the cornea and the back of the lens as features to track. Still more sensitive types of eye trackers may image features from inside the eye, such as the retinal blood vessels, and follow these features as the eye rotates.

Moreover, human eye movements are typically characterized as either fixations (i.e., when the eye gaze pauses in a certain position) or saccades (i.e., when the eye moves to another position). Fixations may include microsaccades, i.e., small, involuntary saccades that occur during attempted fixation. The resulting series of fixations and saccades may be referred to as a "scanpath." When the eye follows a moving object, this may be referred to as "smooth pursuit." Most information from the eye is made available during either a fixation or a smooth pursuit, but not during a saccade. Thus, video-based gaze trackers may run at 240, 350, or even 1000-1250 HZ or higher speeds in order to capture fixations or correctly measure saccade dynamics.

The real-time user context could additionally be derived from observation of the user's present state and surroundings, which may be matched to a task within a known workflow. For instance, the user's present surroundings may match the surroundings associated with a task that the user has performed in the past as part of a known workflow. As an example, if the user looks at a coffee brewing machine, and the present time is 6:00 AM, it may be determined that the user routinely makes coffee at 6:00 AM (a known workflow), and it may be further determined that the coffee brewing machine should be turned on in response to the user looking at the coffee brewing machine.

As another example, real-time user context could be inferred from the physical proximity of the user to the object the user is gazing at. For instance, if the user is gazing at a stereo from ten feet away, it may be determined that the stereo should be turned on or that the volume of the stereo should be adjusted. However, if the user is gazing at the stereo from three feet away, it may be determined that the stereo should be tuned to a new station. Thus, based on the inference of a real-time context and user gaze, examples of the present disclosure may synchronize the real-time context to a known workflow and/or suggest task alternatives to improve the workflow (e.g., to provide a better result of the workflow, to complete the workflow more quickly, or the like). Thus, workflows may be adapted dynamically in response to real-time user context and user gaze.

The real-time context could also be derived from stored information. For instance, the real-time context may relate to the user's experience and abilities, as the experience and abilities relate to the workflow at hand. As an example, if the user is a technician who has been dispatched to repair a piece of telecommunications equipment, the real-time context may include the number of similar repairs that the user has performed in the past and whether the user has any preferences with respect to the manner in which the similar repairs were made. As another example, the real-time context could be derived from a stored service request or trouble ticket submitted by a telecommunications customer (e.g., a report of malfunctioning set top box).

Thus, examples of the present disclosure may adapt digital workflows to the contexts of the physical environments within which the workflows are to be performed and/or to the users performing the workflows.

Examples of the present disclosure may be used in fields including technical support. For instance, a technician performing a repair in the field may utilize an XR-based application to assist with the repair. The XR-based application may communicate a defined workflow to the technician, where the defined workflow provides a series of tasks for making the repair. However, if an unknown or unexpected condition is encountered in the field, a static workflow may hit a point where it is impossible to proceed (e.g., the static workflow may not know how to address the unknown or unexpected condition, which may become a workflow obstacle). However, examples of the present disclosure may be able to observe the real-time conditions in the field, including the user's gaze, and provide the technician with suggestions for working around the unknown or unexpected condition, thereby allowing the workflow to proceed. Such an approach may also shorten the time needed to train new technicians, or to train experienced technicians on new processes.

In further examples, an XR-based application may allow an end user (e.g., a customer) to install and/or repair equipment in their home or office, allowing for potentially quicker service to the end user. For instance, the XR-based application may communicate a defined workflow to the end user, where the defined workflow provides a series of tasks for completing the installation or repair. The defined workflow may be adapted to the customer's specific circumstances (e.g., location of installation or repair, model or age of equipment being installed or repaired, etc.). In further examples, the XR-based application may incorporate and communicate real-time guidance from a human technician.

Within the context of the present disclosure, "real-time context" is understood to refer to the context of a user at the time that the user is performing a workflow (or requesting assistance in performing a workflow). Data about the "real-time context" may be collected at the user side as the user is performing the workflow, and a system may utilize the collected data to make adjustments to the workflow. The adjustments may also be communicated to the user as the user is performing the workflow.

To further aid in understanding the present disclosure, FIG. 1 illustrates an example system 100 in which examples of the present disclosure for gaze-based workflow adaptation may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
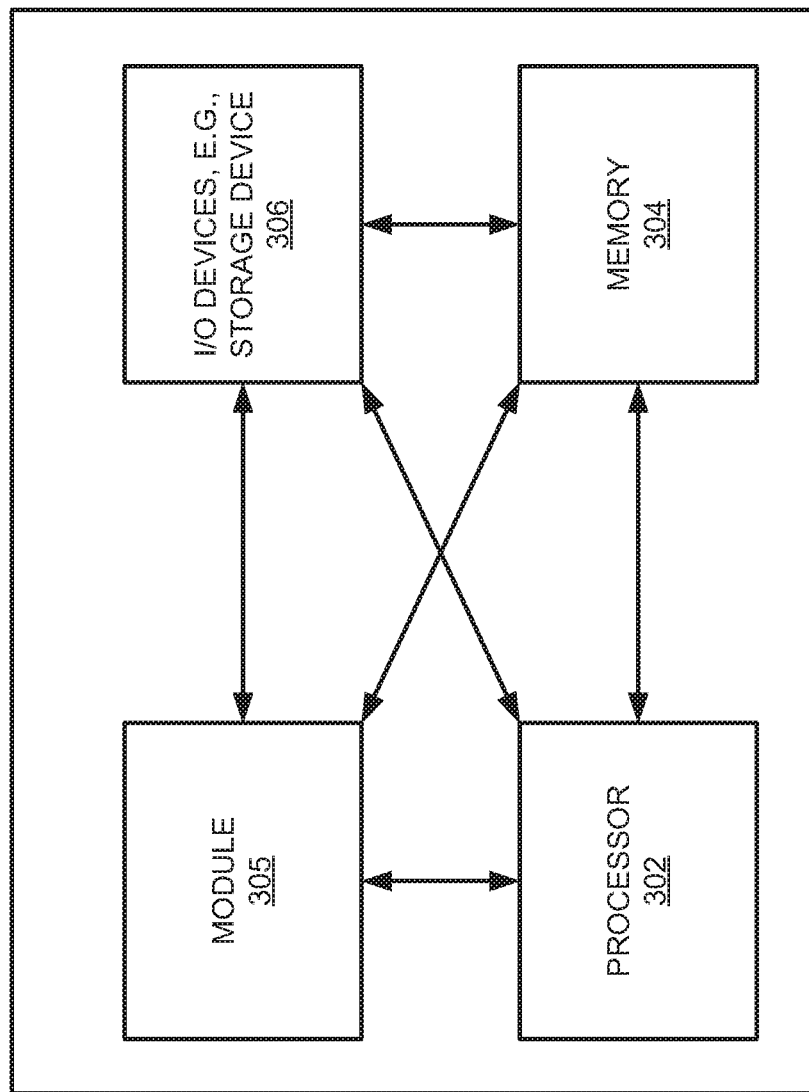
FIG. 3 depicts a high-level block diagram of a computing device specifically programmed to perform the functions described herein.

In accordance with the present disclosure, application server (AS) 104 may comprise a computing system or server, such as computing system 300 depicted in FIG. 3, and may be configured to provide one or more operations or functions for gaze-based workflow adaptation, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for gaze-based workflow adaptation, as described herein. For instance, the DB 106 may store data including known workflows (e.g., workflows that have been performed in the past). The known workflows may be annotated or updated with information concerning different adjustments that may be made based on context.

In a further example, the DB 106 may store machine learning models that can be used to adapt known workflows based on observations of real-time context. As referred to herein, a machine learning model (MLM) (or machine learning-based model) may comprise a machine learning algorithm (MLA) that has been "trained" or configured in accordance with input data (e.g., training data) to perform a particular service, e.g., to adjust workflow tasks in response to observations of real-time user context. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In a further example, AS 104 may comprise a physical storage device (e.g., a database server), to store various types of information in support of systems for gaze-based workflow adaptation, in accordance with the present disclosure. For example, AS 104 may store any or all of the information stored by the DB 106.

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for gaze-based workflow adaptation, in accordance with the present disclosure. For ease of illustration, various additional elements of network 102 are omitted from FIG. 1.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in further communication with a plurality of user endpoint devices (UEs), such as devices 108 and 110. Similarly, access network 122 may be in further communication with a plurality of user endpoint devices (UEs), such as devices 112 and 114. In one example, UEs 108-114 may each comprise a mobile device, a cellular smart phone, a wearable computing device (e.g., smart glasses, augmented reality glasses, head mounted displays, or headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In a further example, at least some of the UEs 108-114 may include integrated sensors that can detect information about the conditions surrounding the UEs 108-114 and can transmit the detected information to the AS 104 and/or DB 106. For instance the integrated sensors may include still and/or video cameras, global positioning system sensors, light sensors, thermometers, accelerometers, and/or the like. In one example, UEs 108-114 may each comprise programs, logic or instructions for performing functions in connection with examples of the present disclosure for gaze-based workflow adaptation. For example, UEs 108-114 may each comprise a computing system or device, such as computing system 300 depicted in FIG. 3, and may be configured to provide one or more operations or functions in connection with examples of the present disclosure for gaze-based workflow adaptation, as described herein.

In a further example, the access network 120 may be in further communication with at least one sensor 116. Similarly, the access network 122 may be in further communication with at least one sensor 118. The sensors 116 and 118 may comprise sensors that function independently of (e.g., are not integrated into) the UEs 108-114. However, the sensors 116 and 118 could be integrated into other devices, including home and office appliances, vehicles, manufacturing systems, and the like. For instance, the sensors 116 and 118 may comprise Internet of Things (IoT) sensors configured to capture and transmit data about a surrounding environment. Thus, the sensors 116 and 188 may include still and/or video cameras, global positioning system sensors, light sensors, thermometers, accelerometers, and/or the like.

In one example, the AS 104 may identify workflows that are applicable to a user's real-time context. The AS 104 may also adapt a known workflow in response to a user's real-time context, for example where the real-time context presents some deviation from the conditions that are expected by the known workflow. The AS 104 may also create triggers for a known workflow, where the triggers cause specific actions to be taken in response to the user's gaze (e.g., the direction and/or duration of the user's gaze). For instance, if the user gazes at a specific item for a threshold period of time or at a time that falls within some defined range of times, the user's gaze may cause a signal to be sent to a device or system that acts upon the specific item.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth. Thus, these and other modifications are all contemplated within the scope of the present disclosure.

Figure 2:
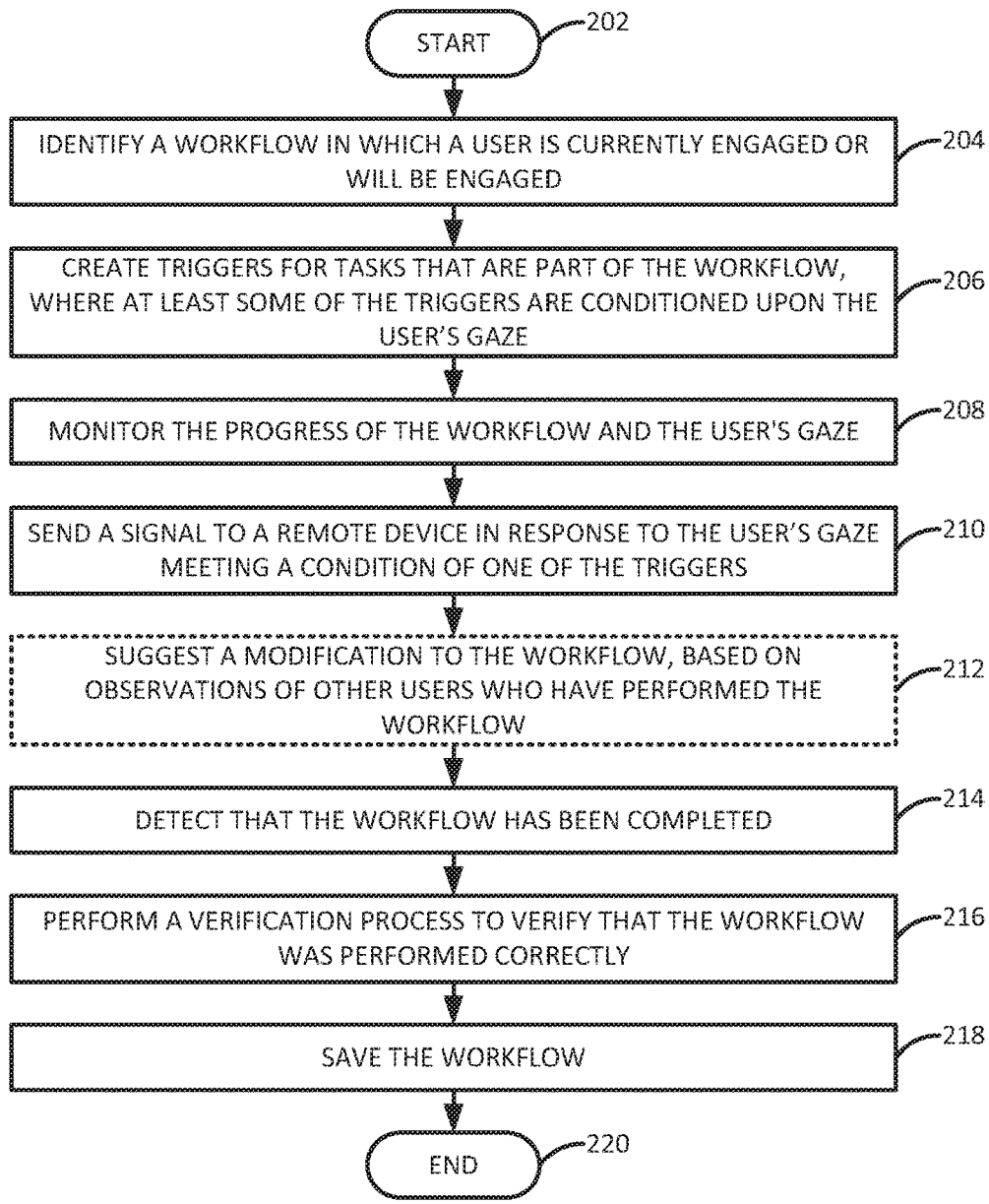
FIG. 2 illustrates a flowchart of an example method for gaze-based workflow adaptation.

FIG. 2 illustrates a flowchart of an example method 200 for gaze-based workflow adaptation. In one example, the method 200 may be used to adapt workflows based on real-time user context when network conditions are stable (e.g., the measured latency does not vary with higher than a threshold standard deviation, where the threshold standard deviation may be, for instance, thirty milliseconds). The steps, functions, or operations of the method 200 may be performed, for example, by the AS 104 and/or one or the wearable UEs 110 or 114 illustrated in FIG. 1. For instance, if a wearable display device has a sufficiently powerful processor, the wearable display device may perform all steps of the method 200. Alternatively, to conserve processing power, the wearable display device may offload some of the more processing intensive steps of the method 200 to a remote application server.

In another example, the steps, functions, or operations of method 200 may be performed by a computing device or system 300, and/or processor 302 as described in connection with FIG. 3 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processor, such as processor 302.

The method 200 begins in step 202. In step 204, the processor may identify a workflow in which a user is currently engaged or in which the user will be engaged. In one example, the processor may identify the workflow based on an analysis of dynamic, real-time data collected directly from the location at which the workflow is to be performed. For instance, the processor may receive streams of data from one or more sensors that are deployed at the location, including cameras, global positioning system sensors, accelerometers, thermometers, proximity sensors, contact sensors, infrared sensors, microphones, or the like. As an example, if the streams of data include images of a set top box, the processor may identify a workflow for installing, activating, and/or troubleshooting a set top box. Alternatively, if the streams of data include images of an HVAC system, the processor may identify a workflow for installing, activating, and/or troubleshooting an HVAC system and so on.

In another example, the processor may identify the workflow based on static data (e.g., data that is not necessarily collected in real time or from the location at which the workflow is to be performed). For instance, the processor may retrieve a service request or trouble ticket that was submitted to a customer service center, where the service request identifies the nature of a problem to be corrected or an action to be performed by the user, a location of the problem or action, a severity of the problem or action, and/or a duration of the problem or action. As an example, if the service request indicates that a customer has been unable to connect to a video streaming service through his set top box for a week, then the processor may identify a workflow for troubleshooting the set top box's network connections.

In one example, the workflow may be specific to the user. For instance, difference users may have difference preferences with respect to performing the same actions. As an example, a workflow may include a plurality of tasks that do not necessarily have to be performed in a defined order. Two different users may therefore prefer to perform the plurality of tasks in different orders. The processor may be able to determine the identity of the user (e.g., by the user explicitly identifying himself the system, or by observing identifying information about the user) and retrieve a version of the workflow that is known to be preferred by the user.

The workflow may be retrieved from a database that stores a plurality of workflows. The stored workflows may comprise generic workflows and/or workflows that have been customized for specific users and/or contexts. In addition, some of the workflows may be crowdsourced from third parties or external sources. For instance, if the workflow relates to assembling a swing set, a social network user may have uploaded a video showing a novel way to assemble the swing set. The uploaded video may serve as a workflow.

In step 206, the processor may create triggers for tasks that are part of the workflow, where at least some of the triggers are conditioned upon the user's gaze (i.e., when the user's gaze meets a defined criterion, a defined action is automatically taken). For instance, an action may be automatically taken in response to the user looking at a specific object or location for a threshold period of time.

In one example, the triggers in general may specify actions that are taken in response to the detection of expected events during performance of the workflow. Expected events may include the expected duration of a task or user gaze (e.g., take Action A when duration of task B exceeds x seconds), objects that the user is expected to look at or manipulate (e.g., take Action B when the user looks at Object Y), locations at which tasks are expected to be completed (e.g., take Action C when the user moves to Location Z), or the like. In another example, a trigger may specify an action that is to be taken in response to the appearance of an object. For instance, a visual model of the object may be created to show what the object looks like under "normal" conditions. A trigger may specify an action to be taken when the observed appearance of the object deviates within some threshold from the visual model. Triggers may be created automatically using machine learning techniques that learn ranges and/or appearances of expected events.

In step 208, the processor may monitor the progress of the workflow, which may include monitoring the user's gaze. For instance, the processor may receive feeds from one or more sensors positioned in the location where the workflow is being performed, and may observe the state and progress of the workflow through these feeds. As an example, a still or video camera may provide the processor with images from the location of the workflow, so that the processor can determine which task of the workflow is currently being performed. The processor may also be able to determine from these images how long the task is taking to complete.

As part of monitoring the progress of the workflow, the processor may also monitor the user's gaze. For instance, the processor may observe where the user is looking (e.g., at a specific object or location) and for how long. The processor may obtain information about the user's gaze from cameras located around the user or from cameras, accelerometers, or other sensors that the user may be wearing (e.g., in a head mounted display or similar device).

In step 210, the processor may send a signal to another device in response to the user's observed gaze meeting the condition of one of the triggers. In one example, the user's context may also meet a condition of the trigger. The signal may further be sent in response to the progress of the workflow reaching some defined point. For instance, if the user is a technician installing a piece of telecommunications equipment in the field, and the technician gazes at the equipment (e.g., the telecommunications equipment having equipment identifying information, e.g., Media Access Control address, IF address, and the like) for a threshold period of time (e.g., x seconds) after connecting the equipment to a network, the processor may send a signal to a backend service that causes the backend service to send a test signal over the network to the equipment (where the test signal may, for example, validate the line signal strength to the equipment). Alternatively, if the processor determines that test signal has already been sent or is currently being sent (real-time context), then the signal to the backend service may cause the backend service to stop sending the test signal. For instance, illumination of a light emitting diode (LED) indicator on the equipment may indicate that the equipment is already receiving the test signal.

In optional step 212 (illustrated in phantom), the processor may suggest a modification to the workflow, based on observations of other users who have performed the same workflow. For instance, the processor may observe that the user is having trouble with a particular task or set of tasks. In response, the processor may determine that other users have developed more efficient ways of completing the task or set of tasks, or that performing certain tasks in certain orders may help the workflow complete more quickly. The processor may use this information to make suggestions to the user for improving the workflow.

In step 214, the processor may detect, based on the monitoring, that the workflow has been completed. For instance, the processor may observe that the user has performed the final task of the workflow. Alternatively, the user may indicate to the processor that he or she has finished the workflow.

In step 216, the processor may perform a verification process to verify that the workflow was performed correctly, e.g., that the workflow has produced the intended result. For instance, if the workflow relates to the installation of a piece of telecommunications equipment, the verification process may verify that the piece of telecommunications equipment is properly installed, connected, and functioning. In one example, the verification process may involve verifying that all required tasks of the workflow have been performed. In another example, the verification process may verify through observation (e.g., via analysis of images captured by one or more sensors) that an object is positioned in an expected location and/or orientation.

In some examples, the processor may not wait until the workflow is completed to perform the verification process. For instance, a verification process could be performed upon the completion of each task, upon the completion of every other task, upon the completion of select tasks, or the like.

In step 218, the processor may save the workflow, including any recommended changes that were accepted by the user (e.g., in accordance with step 212), gaze-based triggers that were created (e.g., in accordance with step 206), results from the verification process, and any learned preferences associated with the user. The workflow may be stored in a workflow database for future use.

The method 200 may end in step 220.

Although examples of the present disclosure have been described within the context of maintaining telecommunications equipment, in further instances, examples of the present disclosure may be employed more generally to any workflow- or process-heavy actions where it may be desirable to increase performance, safety, and/or customer satisfaction. For instance, examples of the present disclosure could assist in following assembly instructions from a kit or package (e.g., assembling a piece of furniture or a toy), in performing construction work on an assembly line (e.g., constructing a complex piece of machinery of electronics), in performing construction or assembly of physical or digital components (e.g., constructing a building façade or an integrated circuit), or in providing a guided process for self-install and repair kits (e.g., troubleshooting consumer appliances, installing multimedia equipment, etc.).

Still further examples of the present disclosure could be used to initiate on-demand teleconference services. For instance, if a technician who has been dispatched to perform a repair on a piece of telecommunications equipment encounters an unusual or anomalous condition (e.g., an unexpected equipment configuration), the technician may initiate an interactive dialog with a remote technician (who could be a human technician or an artificial intelligence-based assistant). The remote technician could be granted some degree of control over the repair.

Examples of the present disclosure could also be employed in on-demand robotics (e.g., robots, unmanned vehicles, etc.). For instance, a robot can be deployed to repair or troubleshoot a piece of malfunctioning telecommunications equipment when the nearest human technician is too far away or too busy. In this case, actions could be triggered by the "gaze" (e.g., camera focus, camera position and so on) of the robot.

Further examples of the present disclosure could be employed to provide XR training scenarios (e.g., for training firefighters, medical personnel, pilots, and other professions that may train using simulated environments).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a wearable display device or an application server could be implemented as illustrated in FIG. 3.

As depicted in FIG. 3, the system 300 comprises a hardware processor element 302, a memory 304, a module 305 for gaze-based workflow adaptation, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for gaze-based workflow adaptation may include circuitry and/or logic for performing special purpose functions relating to streaming volumetric video content. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for gaze-based workflow adaptation (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for gaze-based workflow adaptation (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
   identifying, by a processor, a workflow being performed by a user in a physical environment, where the workflow comprises a plurality of tasks that collectively achieves a desired goal with respect to an object in the physical environment;
   creating, by the processor, a first trigger for a first task of the plurality of tasks, wherein the first trigger specifies a first action to be automatically taken in response to an observed appearance of the object deviating from an expected appearance of the object during a same time that a gaze of the user is focused on the object during the first task of the workflow, wherein the expected appearance of the object is defined by a visual model of the object, and the first trigger specifies that the first action is to be taken when the observed appearance deviates from the visual model by more than a threshold;

creating, by the processor, a second trigger for a second task of the plurality of tasks, wherein the second trigger specifies a second action to be automatically taken in response to the observed appearance of the object deviating from the expected appearance of the object during a same time that the gaze of the user is focused on the object during the second task of the workflow, wherein the second trigger specifies that the second action is to be taken when the observed appearance deviates from the visual model by more than the threshold;

monitoring, by the processor, a progress of the workflow to determine a current task of the workflow that is being performed by the user;

monitoring, by the processor, the gaze of the user; and sending, by the processor, a signal to a remote device in response to the observed appearance of the object deviating from the expected appearance of the object during a same time that the gaze of the user is focused on the object, wherein the signal instructs the remote device to take the first action in response to determining that the current task is the first task and to take the second action in response to determining that the current task is the second task.

2. The method of claim 1, wherein the identifying comprises:
analyzing, by the processor, data provided by a sensor that is positioned in a location of the user.

3. The method of claim 2, wherein the sensor is integrated into a device that is worn by the user.

4. The method of claim 3, wherein the device that is worn by the user comprises a head mounted display.

5. The method of claim 1, wherein the identifying comprises:
retrieving, by the processor, a service request identifying an action to be performed by the user.

6. The method of claim 1, wherein the workflow is customized to accommodate a preference of the user with respect to at least one task of the plurality of tasks.

7. The method of claim 1, further comprising:
suggesting, by the processor, a modification to the workflow, based on an observation of another user who has performed the workflow.

8. The method of claim 7, wherein the modification alters a way in which at least one task of the plurality of tasks is performed.

9. The method of claim 1, further comprising:
detecting, by the processor, that the workflow has been completed; and
performing, by the processor, a verification process to verify that the workflow has been performed correctly.

10. The method of claim 1, further comprising:
storing the workflow, including the first trigger and the second trigger, for future use in achieving the desired goal.

11. The method of claim 1, wherein the user is a technician who has been dispatched on behalf of a service provider.

12. The method of claim 11, wherein the object comprises a piece of telecommunications equipment being serviced by the technician.

13. The method of claim 12, wherein the method is performed by an extended reality-based application.

14. The method of claim 13, wherein the extended reality-based application allows the technician to initiate an interactive dialog with a remote technician who is not present at the piece of telecommunications equipment.

15. The method of claim 1, wherein the user is an unmanned vehicle, and the gaze of the user comprises a focus of a camera integrated into the unmanned vehicle.

16. The method of claim 15, wherein the object comprises a piece of telecommunications equipment being serviced by the unmanned vehicle.

17. The method of claim 1, wherein the workflow comprises a training simulation for the user.

18. The method of claim 1, wherein the object is a physical object and the observed appearance of the object comprises a real-time appearance of the physical object.

19. A non-transitory computer-readable storage medium storing instructions which, when executed by a processor, cause the processor to perform operations, the operations comprising:
identifying a workflow being performed by a user in a physical environment, where the workflow comprises a plurality of tasks that collectively achieves a desired goal with respect to an object in the physical environment;
creating a first trigger for a first task of the plurality of tasks, wherein the first trigger specifies a first action to be automatically taken in response to an observed appearance of the object deviating from an expected appearance of the object during a same time that a gaze of the user is focused on the object during the first task of the workflow, wherein the expected appearance of the object is defined by a visual model of the object, and the first trigger specifies that the first action is to be taken when the observed appearance deviates from the visual model by more than a threshold;
creating a second trigger for a second task of the plurality of tasks, wherein the second trigger specifies a second action to be automatically taken in response to the observed appearance of the object deviating from the expected appearance of the object during a same time that the gaze of the user is focused on the object during the second task of the workflow, wherein the second trigger specifies that the second action is to be taken when the observed appearance deviates from the visual model by more than the threshold;
monitoring a progress of the workflow to determine a current task of the workflow that is being performed by the user;
monitoring the gaze of the user; and
sending a signal to a remote device in response to the observed appearance of the object deviating from the expected appearance of the object during a same time that the gaze of the user is focused on the object, wherein the signal instructs the remote device to take the first action in response to determining that the current task is the first task and to take the second action in response to determining that the current task is the second task.

20. A system comprising:
a processor deployed in a telecommunication service provider network; and a non-transitory computer-readable medium storing instructions which, when executed by the processor, cause the processor to perform operations, the operations comprising:
- identifying a workflow being performed by a user in a physical environment, where the workflow comprises a plurality of tasks that collectively achieves a desired goal with respect to an object in the physical environment;
- creating a first trigger for a first task of the plurality of tasks, wherein the first trigger specifies a first action to be automatically taken in response to an observed appearance of the object deviating from an expected appearance of the object during a same time that a gaze of the user is focused on the object during the first task of the workflow, wherein the expected appearance of the object is defined by a visual model of the object, and the first trigger specifies that the first action is to be taken when the observed appearance deviates from the visual model by more than a threshold;
- creating a second trigger for a second task of the plurality of tasks, wherein the second trigger specifies a second action to be automatically taken in response to the observed appearance of the object deviating from the expected appearance of the object during a same time that the gaze of the user is focused on the object during the second task of the workflow, wherein the second trigger specifies that the second action is to be taken when the observed appearance deviates from the visual model by more than the threshold;
- monitoring a progress of the workflow to determine a current task of the workflow that is being performed by the user;
- monitoring the gaze of the user; and
- sending a signal to a remote device in response to the observed appearance of the object deviating from the expected appearance of the object during a same time that the gaze of the user is focused on the object, wherein the signal instructs the remote device to take the first action in response to determining that the current task is the first task and to take the second action in response to determining that the current task is the second task.

* * * * *